(12) United States Patent
Meijer et al.

(10) Patent No.: US 10,154,307 B2
(45) Date of Patent: *Dec. 11, 2018

(54) SYSTEM AND METHOD FOR DETECTING THE REMOVAL OF A CONTROLLING DEVICE

(71) Applicant: Universal Electronics Inc., Santa Ana, CA (US)

(72) Inventors: Gerben Meijer, Oosterbeek (NL); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,930

(22) Filed: Feb. 14, 2017

(65) Prior Publication Data

US 2017/0155954 A1    Jun. 1, 2017

Related U.S. Application Data

(63) Continuation of application No. 13/460,267, filed on Apr. 30, 2012, now Pat. No. 9,654,824.

(51) Int. Cl.
| | |
|---|---|
| *H04H 60/32* | (2008.01) |
| *H04N 21/442* | (2011.01) |
| *H04N 21/214* | (2011.01) |
| *H04N 21/4363* | (2011.01) |
| *H04N 21/443* | (2011.01) |

(Continued)

(52) U.S. Cl.
CPC ....... *H04N 21/442* (2013.01); *H04N 21/2143* (2013.01); *H04N 21/42221* (2013.01); *H04N 21/43637* (2013.01); *H04N 21/4436* (2013.01); *H04N 21/44227* (2013.01); *H04N 21/8126* (2013.01)

(58) Field of Classification Search
CPC ............ H04N 21/442; H04N 21/2143; H04N 21/42221; H04N 21/43637
USPC ............................................... 725/14, 38, 58
See application file for complete search history.

(56) References Cited

U.S. PATENT DOCUMENTS

| | | | |
|---|---|---|---|
| 4,959,810 | A | 9/1990 | Darbee et al. |
| 5,406,260 | A | 4/1995 | Cummings et al. |
| 5,455,570 | A | 10/1995 | Cook et al. |

(Continued)

FOREIGN PATENT DOCUMENTS

| | | |
|---|---|---|
| CN | 1139027 C | 2/2004 |
| WO | 99/15967 A1 | 4/1999 |

OTHER PUBLICATIONS

EPO, Examination Report issued on EP patent application No. 13784675.4, dated Feb. 16, 2016, 7 pages.

(Continued)

*Primary Examiner* — Jivka Rabovianski
(74) *Attorney, Agent, or Firm* — Greenberg Traurig, LLP

(57) ABSTRACT

A system and method for using a controllable appliance to report an inoperable state of a controlling device. The appliance is caused to repeatedly determine, at a first predetermined timed interval, if a wireless notification signal, repeatedly transmitted by the controlling device at a second predetermined timed interval, has been received from the controlling device. When the wireless notification signal has not been received from the controlling device within the first predetermined timed interval, the appliance is caused to issue a status notification that the controlling device is in an inoperable state.

10 Claims, 5 Drawing Sheets

(51) Int. Cl.
  *H04N 21/81* (2011.01)
  *H04N 21/422* (2011.01)

(56) References Cited

U.S. PATENT DOCUMENTS

| | | |
|---|---|---|
| 5,506,572 A | 4/1996 | Hills et al. |
| 5,999,799 A | 12/1999 | Hu et al. |
| 6,049,293 A | 4/2000 | Koot et al. |
| 7,046,185 B2 | 5/2006 | Griesau et al. |
| 7,154,428 B2 | 12/2006 | deClercq et al. |
| 7,890,816 B2 | 2/2011 | Martch et al. |
| 7,907,060 B2 | 3/2011 | Reams |
| 2006/0220834 A1 | 10/2006 | Maeng |
| 2007/0200727 A1 | 8/2007 | Sakamoto |
| 2009/0184161 A1 | 7/2009 | Ueno et al. |

OTHER PUBLICATIONS

EPO, extended European Search Report issued on EP patent application No. 13784675.4, dated Jul. 2, 2015, 10 pages.
ISA/US, Int. Search Report and Written Opinion issued on PCT application No. US13/37553, dated Aug. 26, 2013, 27 pages.
Chinese Patent Office, 1st Office Action issued on Chinese patent application No. 201380022555.X, received Oct. 22, 2017, 11 pages.

SYSTEM AND METHOD FOR DETECTING THE REMOVAL OF A CONTROLLING DEVICE

RELATED APPLICATION INFORMATION

This application claims the benefit of and is a continuation of U.S. application Ser. No. 13/460,267, filed on Apr. 30, 2012, which application is incorporated herein by reference in its entirety.

BACKGROUND

Controlling devices, for example remote controls, for use in issuing commands to entertainment and other appliances, and the features and functionality provided by such controlling devices are well known in the art. Such controlling devices may be universal, that is, capable of controlling multiple appliance types of different manufacture; unified, that is, capable of controlling multiple appliance types of the same manufacture; or dedicated, that is, capable only of controlling a single appliance of a specific manufacture. Descriptions of such controlling devices may be found, for example, in U.S. Pat. Nos. 4,959,810, 5,455,570, 7,046,185, or 7,154,428. The majority of such devices are hand held and battery powered, i.e., portable.

In the hospitality industry, such controlling devices are commonly furnished as standard guest room equipment to allow convenient operation of entertainment or other appliances present in the room or suite. However, some segments of the industry may experience an unacceptably high attrition rate, i.e., frequent misplacement or removal of the controlling device from a room by a departing guest.

SUMMARY OF THE INVENTION

This invention relates generally to controlling devices, and more particularly to systems and methods for detecting the removal of a controlling device from a specific area. In an exemplary embodiment presented herein, such an area may comprise the general vicinity of a particular hotel room TV service decoder set top box (STB) with which the controlling device has been paired. To this end, the controlling device may be adapted to periodically transmit a status signal to the decoder box. In the event the decoder box fails to receive a controlling device status report within an acceptable period of time, the decoder box may communicate this fact to the facility's central distribution server, resulting in the generation of an alert message to the front desk or other designated location.

In some embodiments, the periodic status message transmitted by the controlling device may comprise an indication of battery level, performance metrics, or error conditions which may be further utilized at the central distribution server to create alerts to hotel maintenance staff in the event servicing of the controlling device is required.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
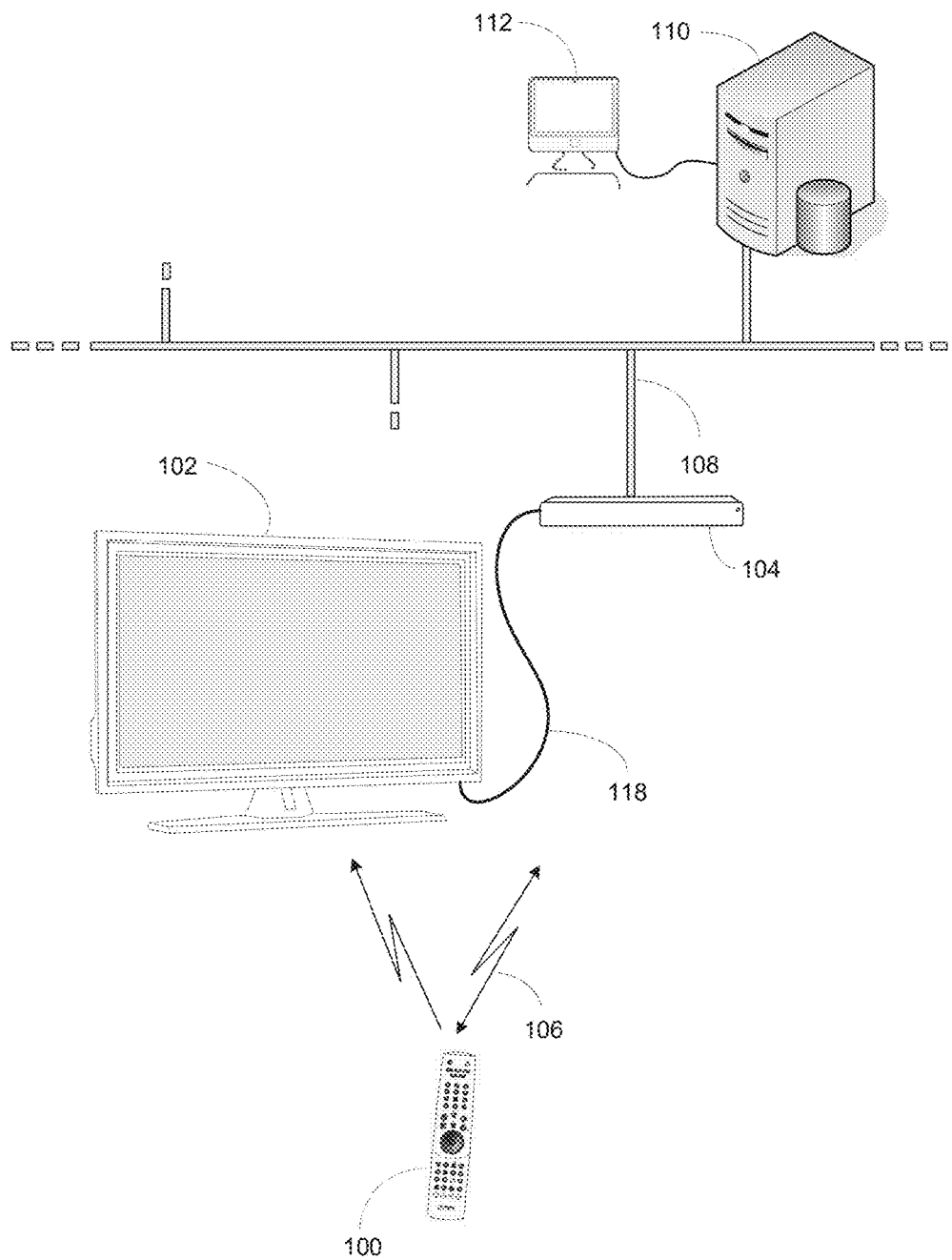
FIG. 1 illustrates an exemplary system in which an exemplary controlling device according to the instant invention may be used.

Turning now to FIG. 1, there is illustrated an exemplary system in which a controlling device 100 is configured to control various controllable appliances, such as a television 102 and a TV service decoder set top box (STB) 104. As is known in the art, the controlling device 100 is capable of transmitting commands to the appliances, using any convenient IR, RF, Point-to-Point, or networked protocol 106, to cause the appliances to perform operational functions. While illustrated in the context of a television 102 and STB 104, it is to be understood that controllable appliances may include, but need not be limited to, televisions, wired or wireless converter set-top boxes ("STBs"), DVD players, audio systems game consoles, lighting, drapery, fans, HVAC systems, thermostats, etc.

In the illustrative system, STB 104 serves as TV service decoder box in a hospitality environment, for example by receiving and decoding an on-demand digital media stream from an in-house network 108 and outputting the decoded signal via a suitable interface 118 to TV set 102. The exemplary media stream may originate from a media server or head end 110.

Figure 2:
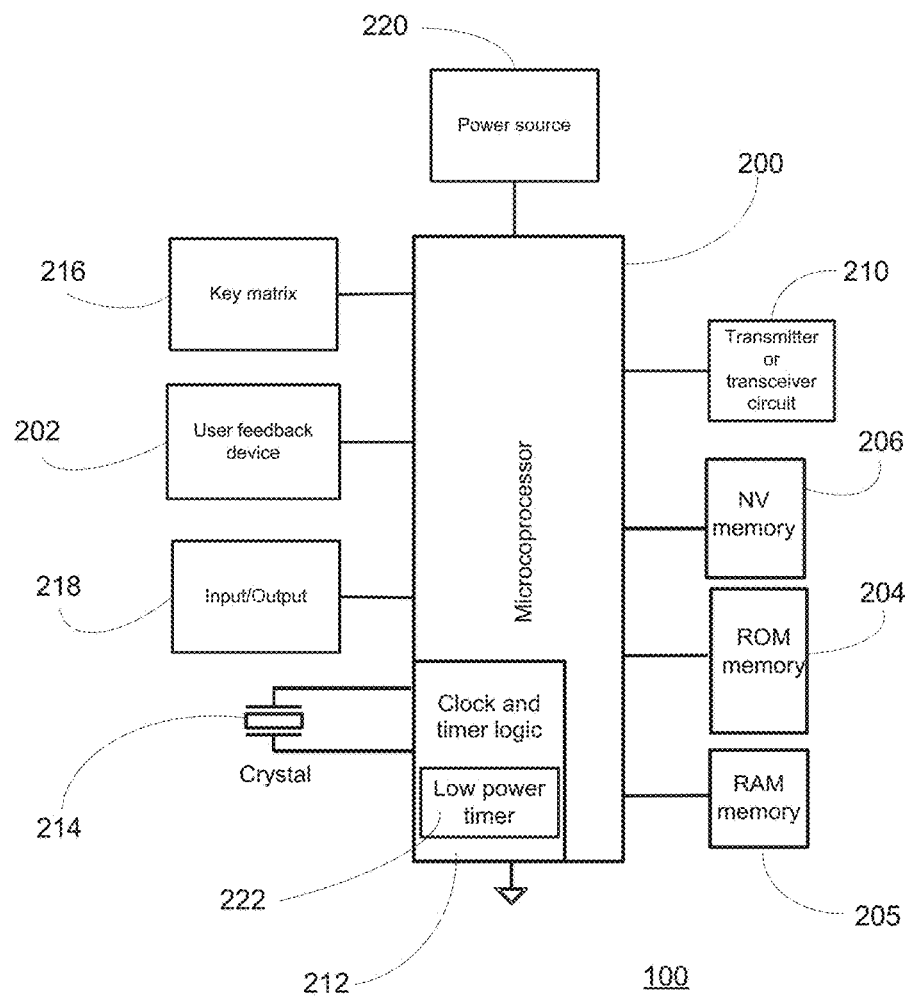
FIG. 2 illustrates a block diagram of exemplary components of the controlling device of FIG. 1.

With reference to FIG. 2, for use in commanding the functional operations of one or more appliances, the controlling device 100 may include, as needed for a particular application, a processor 200 coupled to a ROM memory 204, a RAM memory 205, a key matrix 216 (e.g., hard keys, soft keys such as a touch sensitive surface overlaid on a liquid crystal (LCD), and/or an electroluminescent (EL) display), transmission circuit(s) and/or transceiver circuit(s) 210 (e.g., IR and/or RF), a non-volatile read/write memory 206, a means 202 to provide feedback to the user (e.g., one or more LEDs, illuminable keys, display, speaker, and/or the like), an input/output port 218 such as a serial interface, USB port, modem, Zigbee, WiFi, or Bluetooth transceiver, etc., a power source 220 such as a battery, and clock and timer logic 212 with associated crystal or resonator 214 and a low power timing device 222 such as, for example, a nanopower ring oscillator as may be found in the MAXQ610 microprocessor available from Maxim Integrated Products, Inc.

As will be understood by those skilled in the art, some or all of the non-transitory memories 204, 206 may include executable instructions that are intended to be executed by the processor 200 to control the operation of the controlling device 100 (collectively, the program memory), as well as data which serves to define the necessary control protocols and command values for use in transmitting command signals to controllable appliances (collectively, the command data). In this manner, the processor 200 may be programmed to control the various electronic components within the controlling device 100, e.g., to monitor the key matrix 216, to cause the transmission of signals, etc. The non-volatile read/write memory 206, for example an EEPROM, battery-backed up RAM, FLASH, Smart Card, memory stick, or the like, may additionally be provided to store setup data and parameters as necessary. While the memory 204 is illustrated and described as a ROM memory, memory 204 can also be comprised of any type of readable media, such as ROM, FLASH, EEPROM, or the like. Preferably, the memories 204 and 206 are non-volatile or battery-backed such that data is not required to be reloaded after battery changes. In addition, the memories 204, 205 and 206 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 204 and 206 respectively), and/or may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 may be adapted to be responsive to events, such as a sensed user interaction with the key matrix 216, expiry of a timer, etc. In response to an event, appropriate instructions within the program memory (hereafter the "controlling device operating program") may be executed. For example, when a command function key is actuated on the controlling device 100, the controlling device 100 may retrieve from the command data stored in memory 204, 205, 206 a command value and control protocol corresponding to the actuated function key and, where necessary, current device mode and transmit that command to an intended target appliance, e.g. TV service decoder STB 104, in a format recognizable by that appliance to thereby control one or more functional operations of that appliance. It will be appreciated that the controlling device operating program can be used not only to cause the transmission of commands and/or data to the appliances, but also to perform local operations. While not limiting, local operations that may be performed by the controlling device 100 may include displaying information/data, favorite channel access, macro keys, function key reassignment, etc. Examples of local operations can be found in U.S. Pat. Nos. 5,481,256, 5,959,751, and 6,014,092.

In some embodiments, controlling device 100 may be of the universal type, that is provisioned with a library comprising a multiplicity of command codes and protocols suitable for controlling various appliances. In such cases, for selecting sets of command data to be associated with the specific appliances to be controlled data may be provided to the controlling device 100 that serves to identify each intended target appliance by its make, and/or model, and/or type. The data may be entered via activation of those keys that are also used to cause the transmission of commands to an appliance; may be loaded into controlling device via input/output means 218; may be configured using internal switches or jumpers; etc., as appropriate for a particular embodiment. Such data may be utilized by the controlling device operating program to identify the appropriate command data set within the library of command data that is to be used to transmit recognizable commands in formats appropriate for such identified appliances. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, or 6,225,938 or to pending U.S. patent application Ser. No. 11/515,962, all of like assignee and incorporated herein by reference in their entirety.

As is known in the art, microcontroller 200 may be placed into a quiescent or "stop" mode by the controlling device operating software. When in such a state, the current drawn from power source 220 may be substantially reduced. By way of example, the aforementioned MAXQ610 microcontroller may draw a nominal 3.75 mA when active (running at a full clock speed of 12 MHz, as determined by crystal 214) but only 0.2 µA when in stop mode, i.e., power consumption is reduced by a factor of almost 20,000 when the microcontroller is placed into stop mode. Resumption of processor activity from such a stop mode may be triggered by an external event such as for example user actuation of key matrix 216, a change in state of input/output port 218, etc., and in the case of the exemplary MAXQ610 and similar microcontrollers also by an internal event initiated by a low-speed, low-power, interval timer 222 which may be configured to continue running while the main microcontroller CPU is in stop mode. Such low-power interval timers typically operate at a much lower speed than the primary microprocessor clock, via a secondary crystal or resonator or, as in the case of the exemplary MAXQ610, an internal ring oscillator. By way of example, the MAXQ610 internal "nanopower" ring oscillator operates at a nominal 8 KHz (as contrasted to the primary clock rate of 12 MHz) and consumes only a nominal 40 nA.

As required by a particular microcontroller application, such low-power interval timers may be used to maintain a time-of-day clock; to enable reduced energy consumption during transmission of appliance commands by a controlling device as described in co-pending U.S. patent application Ser. No. 13/028,664; to implement a keypad backlight time-out, etc.; or as disclosed hereafter in an exemplary embodiment of the instant invention to provide wake-up signals for the purpose of issuing periodic status reports to an associated set top box.

Figure 3:
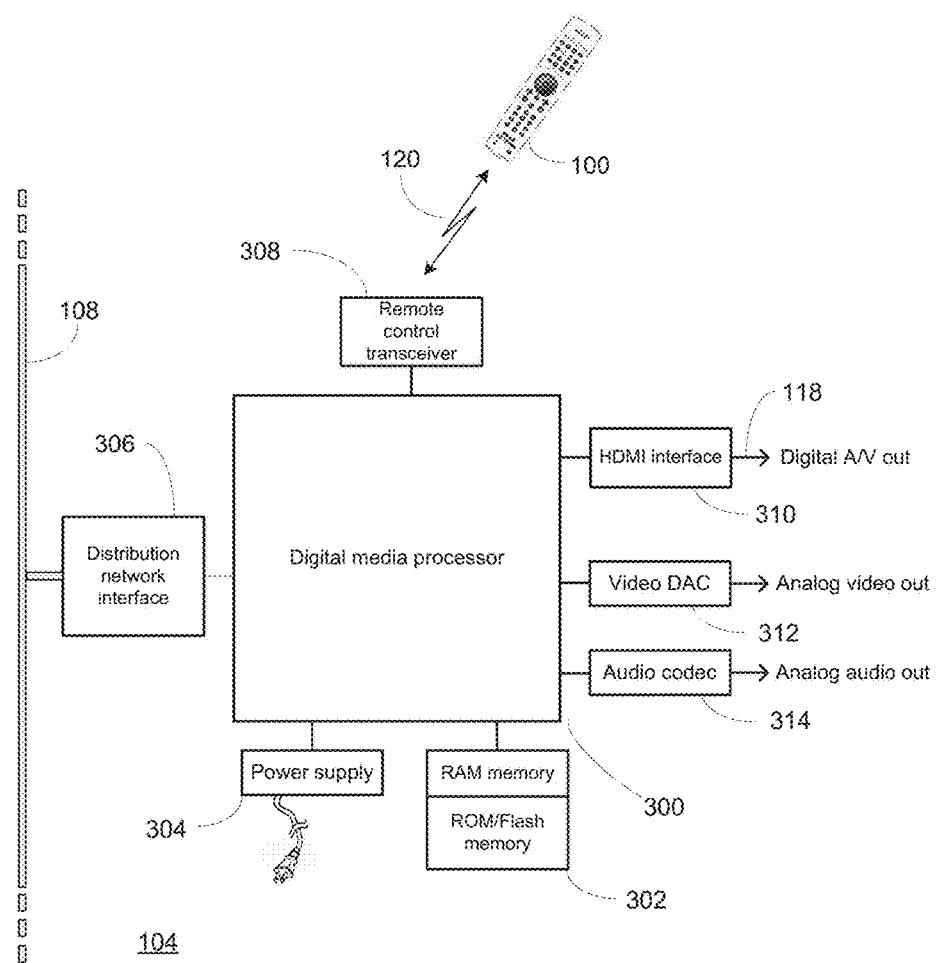
FIG. 3 illustrates a block diagram of exemplary components of the TV service decoder STB device of FIG. 1.

Turning now to FIG. 3, an exemplary hospitality industry TV service decoder, STB 104, may include, as needed for a particular application, a processor 300 coupled to a memory 302 which may comprise RAM, ROM, and/or Flash memory; a power supply 304; distribution network interface 306 for coupling TV service decoder STB 104 to an in-house media distribution network, for example 108 as illustrated in FIG. 1; a remote control receiver or transceiver 306 for reception of signal from a controlling device, for example 100 as illustrated in FIG. 1; a digital audio/video output interface 310 such as an HDMI port; and optional analog video and audio outputs 312, 314. As will be appreciated, in some embodiments such as for example a TV set expressly intended for deployment in the hospitality industry, the above described TV service decoder components and functionality may be integrated into the TV itself. Accordingly the description of this functionality as embodied in a physically separate STB 104 is provided herein by way of illustration only, and is not intended to be limiting.

As is known in the art, programming instructions may be stored in a non-transitory readable memory 302 ("STB programming") which when executed by processor 400 may enable the STB appliance 104 to receive and decode digital media and data streams from distribution network 118 and to output the received media content to one or more of output ports 310,312,314; to receive, decode, and act upon user commands received from controlling device 100; to display program guide information, listings of available content, or setup and configuration menus at user request and act upon any resulting user input; etc.

Figure 4:
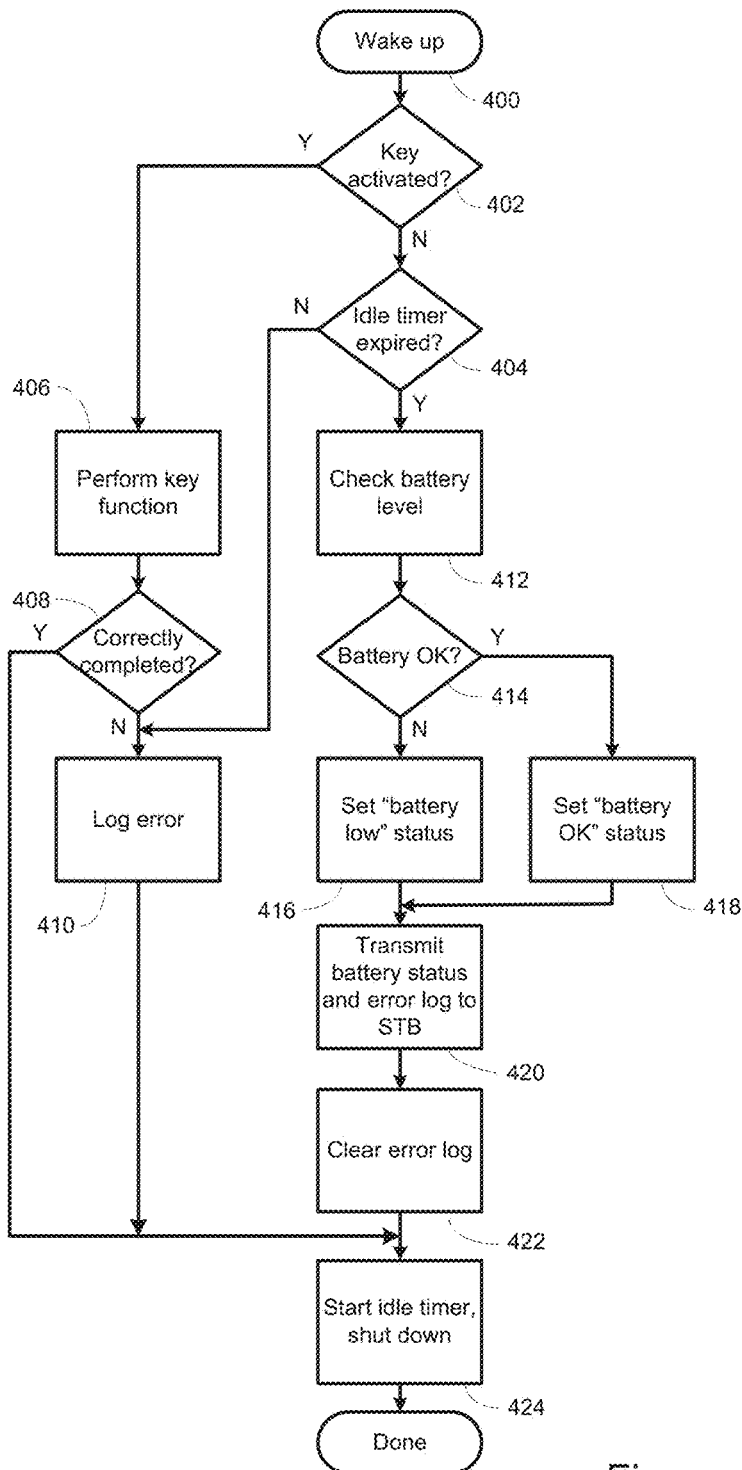
FIG. 4 illustrates in flowchart form an exemplary method by which a controlling device may provide periodic status reports to an associated TV service decoder box.

With reference to FIG. 4, the steps performed by the operating program of an exemplary controlling device 100 in accordance with the teachings of this invention, upon awakening of microcontroller 200 from a quiescent or "stop" state at step 400 may comprise: First, at step 402 the controlling device operating program may determine if the event which triggered awakening of the microcontroller was activation of a function key by a user, i.e., a "key wake up" event as well known in the art. If so, the desired operation, e.g., transmitting a command to one of appliances 102 or 104, may be performed at step 406. At step 408, if the requested operation was determined to be successfully completed, processing continues, else if not, an error status is logged for future reporting to central server 110. To this end, if the controlling device 100 is adapted for two-way communication with an appliance, the appliance can report back to the controlling device that a command or other communication was successfully received and/or acted upon. Similarly, the controlling device may be adapted to monitor itself to determine if a communication was transmitted and/or if an action requested of the controlling device was performed by the controlling device. Thereafter, at step 424 an idle timer is started, for example by initializing a count-down timer associated with a nanopower ring oscillator as may be found in the above referenced Maxim MAXQ610, and the microcontroller returned to the stop state. As will become apparent, the objective of this timer is to ensure that during periods of inactivity TV service decoder STB 104 will receive at least a periodic status message transmission from the controlling device to indicate that controlling device is still present in the local environment. In order to conserve battery energy, the duration of this timer may be selected to be relatively long, in a preferred embodiment of the order of minutes, though the exact duration of this timeout is not critical provided it is proportionate to the corresponding timeout value utilized in the associated TV decoder SRB 104, as described hereafter in conjunction with FIG. 5. As is known in the art, when such longer periods are not within the low power timer capability of the microcontroller of a particular embodiment, multiple intermediate timeouts may utilized in a countdown algorithm.

If the triggering event was not a function key activation, at step 404 the controlling device operating program may next determine if the triggering event was expiry of the idle timer set in step 424 above. If not, an erroneous awakening trigger occurred and this condition may be logged as an error at step 410 as previously described. If, however, the triggering event was an idle timer expiry, at step 412 the battery level of power source 220 may be checked using conventional techniques with a "low" or "OK" battery status being thereby set at steps 414, 416 and 418 as appropriate. Thereafter, at step 420, the resulting battery status and any errors previously logged at step 410 may be transmitted to an associated TV service decoder STB, e.g. 104. Upon completion of the transmission, the error log is cleared at step 422, and the idle timer restarted and microcontroller 200 returned to "stop" mode at step 424.

Figure 5:
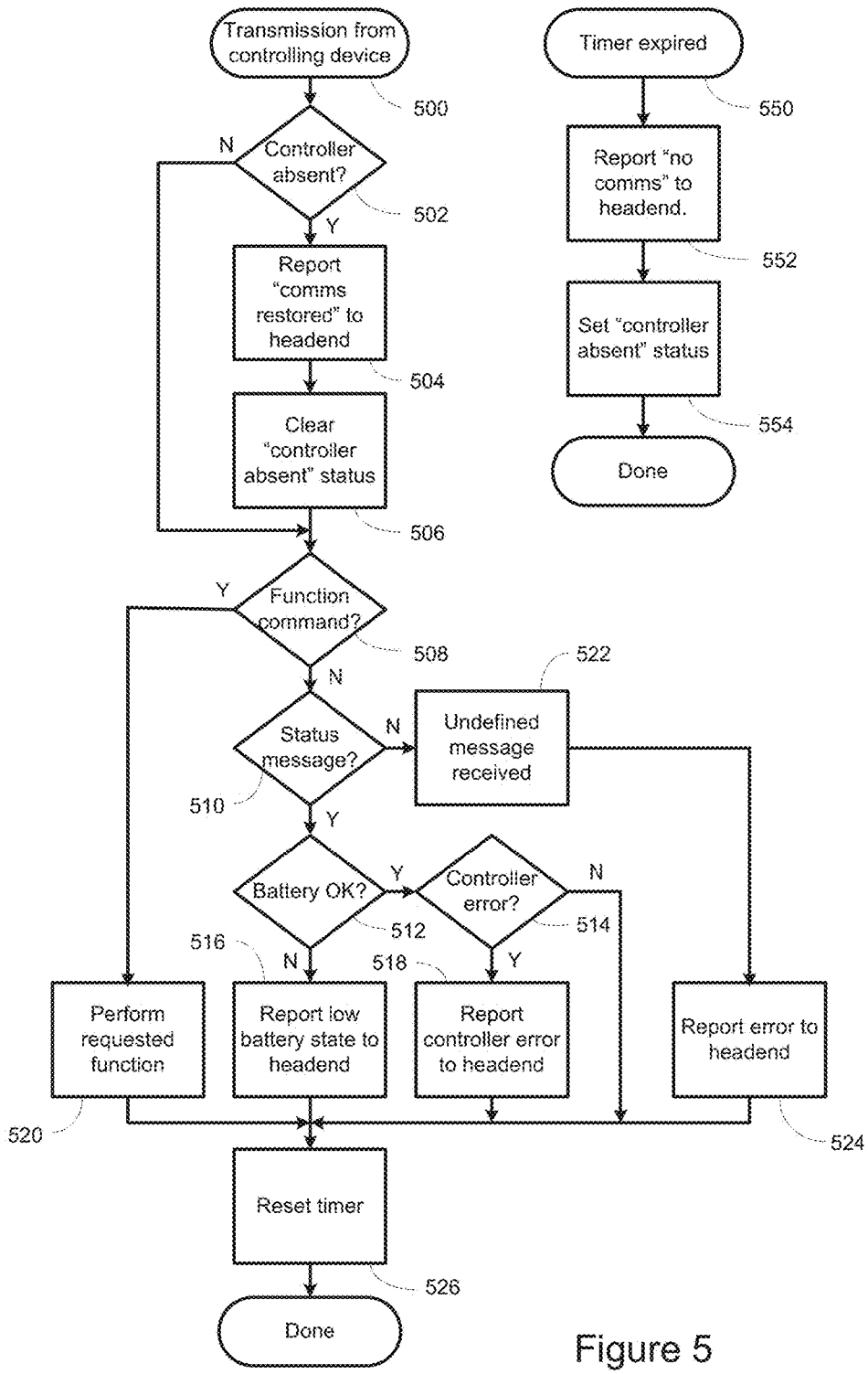
FIG. 5 illustrates in flowchart form an exemplary method by which a TV service decoder box may monitor and interpret status reports from an associated controlling device.

The actions performed by the STB programming of exemplary TV service decoder STB 104 in response to status transmissions from an associated controlling device 100 will now be described in conjunction with FIG. 5. Upon receipt of a transmission from the controlling device at step 500, at step 502 the STB programming may first determine if the controlling device had previously been reported as absent, i.e., had not communicated with STB 104 within a required time interval as will be described in further detail hereafter. If so, at steps 504 and 506 an internal "controller absent status" may be cleared and the restoration of controlling device communication reported to media server head end 110. Next, at step 508 the STB programming may determine if the received transmission constitutes a command to perform an operational function. If so, at step 520 the requested function (e.g., tuning to a channel, selecting a menu item, etc.) may be performed, after which at step 526 an interval timer is restarted and the operation is complete. As will become apparent, the purpose of the interval timer set at step 526 is to detect lack of timely status messages and/or other communications from controlling device 100. Accordingly it will be appreciated that this interval should be somewhat longer than the controlling device idle time set at step 424 of FIG. 4. By way of example without limitation, the time out value for the timer step 526 may be selected to be approximately three times that of the controlling device timer value set at step 424.

Returning to step 508, if the received message was not a command function, at step 510 it may be next determined if the received message constituted a controlling device status message. If not, an undefined or corrupted message may have been received and at step 524 this condition may be reported to media server head end 110 for action as appropriate. If, however, a valid controlling device status was received, then at steps 512 through 518 any abnormal controlling device status may be reported to media server head end 110 for action as appropriate. By way of example, a "low battery" or "controlling device error" report may be forwarded to the facility's maintenance or housekeeping staff for action the next time a room is serviced. Once any abnormalities have been reported, the STB programming continues at step 526 to restart the interval timer as described previously.

In the event the interval timer set at step 524 expires without any intervening communication from controlling device 100, at steps 550, 552 the STB programming may report a "controller absent" status to media server head end 110, after which an internal (to STB 104) "controller absent" status may be set at step 554, for interrogation at step 502 as previously described.

Receipt of such a "controller" absent status by media server headend 110 may result, for example without limitation, in display of a message on a front desk terminal 112 during guest checkout, posting of a voice message or TV display to the guest room querying status of the controlling device, transmission of a report to the facility maintenance department, etc., or any combination thereof.

While various concepts have been described in detail, it will be appreciated by those skilled in the art that various modifications and alternatives to those concepts could be developed in light of the overall teachings of the disclosure. For example, while described above in terms of a hospitality industry controlling device, it will be appreciated that the techniques described herein may be successfully applied in other areas, for example to ensure that a controlling device supplied in conjunction with a home electronic appliance, personal computer, toy, etc., remains in the proximity of the device it is intended to control, etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A system, comprising:
a controllable appliance having a wireless receiver and a first timer, wherein the first timer is used to measure a first plurality of timed intervals each having a first predetermined duration; and
a controlling device having a wireless transmitter;
wherein the controllable appliance further has a processing device and a memory in which is stored instructions executable by the processing device, wherein the instructions, when executed by the processing device, cause the controllable appliance to cause a status notification to be provided to a further device in communication with the controllable appliance when it is determined that at least one of the plurality of timed intervals has expired without a wireless signal originating from the wireless transmitter of the controlling device being received by the wireless receiver.

2. The system as recited in claim 1, wherein the wireless signal comprises a command issued from the controlling device to command a functional operation of the controllable appliance.

3. The system as recited in claim 1, wherein the controllable appliance comprises a set top box and wherein the further device comprises a headend server in communication with the set top box.

4. The system as recited in claim 1, wherein the instructions cause the controllable appliance to restart a measuring of the first plurality of predetermined timed intervals in response to the controllable appliance determining that the wireless signal originating from the wireless transmitter of the controlling device has been received by the wireless receiver.

5. The system as recited in claim 1, wherein the controlling device comprises a second timer that is used to measure a second plurality of timed intervals each having a second predetermined duration, a processing device, and a memory having instructions which, when executed by the processing device, cause the controlling device to transmit the wireless signal by use of the wireless transmitter for reception by the wireless receiver of the controllable appliance at an expiration of each of the second plurality of predetermined timed intervals and wherein the first predetermined duration of each of the first plurality of timed intervals is longer in duration than the second predetermined duration of each of the second plurality of timed intervals.

6. The system as recited in claim 5, wherein the wireless signal that is caused to be transmitted at an expiration of each of the second plurality of predetermined timed intervals comprises data indicative of a battery state for the controlling device.

7. The system as recited in claim 5, wherein the wireless signal that is caused to be transmitted at an expiration of each of the second plurality of predetermined timed intervals comprises data indicative of an error state for the controlling device.

8. The system as recited in claim 5, wherein the instructions cause the controlling device to restart a measuring of the second plurality of timed intervals upon the controlling device entering into a quiescent state.

9. The system as recited in claim 1, wherein the wireless transmitter of the controlling device comprises an infrared transmitter and the wireless receiver of the controllable device comprises an infrared receiver.

10. The system as recited in claim 1, wherein the wireless transmitter of the controlling device comprises a radio frequency transmitter and the wireless receiver of the controllable device comprises a radio frequency transmitter.

* * * * *